(12) United States Patent
Roeder et al.

(10) Patent No.: US 8,832,427 B2
(45) Date of Patent: Sep. 9, 2014

(54) RANGE-BASED QUERIES FOR SEARCHABLE SYMMETRIC ENCRYPTION

(75) Inventors: Thomas Roeder, Redmond, WA (US); Mihaela Ion, Trento (IT)

(73) Assignee: Microsoft Corporation, Redmond, WA (US)

( * ) Notice: Subject to any disclaimer, the term of this patent is extended or adjusted under 35 U.S.C. 154(b) by 106 days.

(21) Appl. No.: 13/435,721

(22) Filed: Mar. 30, 2012

(65) Prior Publication Data

US 2013/0262852 A1 Oct. 3, 2013

(51) Int. Cl.
*H04L 29/06* (2006.01)
*G06F 21/60* (2013.01)

(52) U.S. Cl.
CPC .................... *G06F 21/602* (2013.01)
USPC ......................................... 713/150

(58) Field of Classification Search
None
See application file for complete search history.

(56) References Cited

U.S. PATENT DOCUMENTS

| | | | |
|---|---|---|---|
| 5,687,397 A | 11/1997 | Ohmori | |
| 5,963,642 A | 10/1999 | Goldstein | |
| 7,418,098 B1 | 8/2008 | Mattsson et al. | |
| 7,512,814 B2 | 3/2009 | Chen et al. | |
| 7,689,547 B2 | 3/2010 | Cristofor et al. | |
| 7,702,107 B1 | 4/2010 | Messing | |
| 2004/0243816 A1* | 12/2004 | Hacigumus et al. | 713/193 |
| 2005/0004924 A1 | 1/2005 | Baldwin | |
| 2006/0041533 A1 | 2/2006 | Koyfman | |
| 2007/0294235 A1 | 12/2007 | Millett | |
| 2008/0133935 A1 | 6/2008 | Elovici et al. | |
| 2009/0300351 A1 | 12/2009 | Lei et al. | |
| 2009/0316887 A1 | 12/2009 | Lee et al. | |
| 2010/0054481 A1* | 3/2010 | Jajodia et al. | 380/284 |
| 2010/0114964 A1 | 5/2010 | Kerschbaum et al. | |
| 2010/0121856 A1 | 5/2010 | Lei et al. | |
| 2010/0146299 A1 | 6/2010 | Swaminathan et al. | |
| 2010/0161957 A1 | 6/2010 | Chang et al. | |
| 2010/0306221 A1 | 12/2010 | Lokam et al. | |
| 2011/0035581 A1 | 2/2011 | Maller | |
| 2011/0145594 A1 | 6/2011 | Jho et al. | |

OTHER PUBLICATIONS

Shmueli et al, "Designing Secure Indexes for Encrypted Databases", Proc 19th annual IFIP WG 11.3 Working Conf on Data and Applicatioins Security, Aug. 2005, 15 pgs.

Menezes, "Handbook of Applied Cryptography", Chapter 1, Overview of Cryptography, CRC Press 1996, 48 pgs.

(Continued)

*Primary Examiner* — David Pearson
(74) *Attorney, Agent, or Firm* — Dan Choi; Judy Yee; Micky Minhas

(57) ABSTRACT

Techniques enable range-based queries in searchable symmetric encryption (SSE) systems. A server device includes or provides access to a database that stores encrypted documents along with an encrypted index that maps bucketized terms (e.g., a term coupled with a value range associated with that term) to encrypted documents. Search is performed through a two-step process in which the client first sends a first search token to request the bucketization for a term, then sends one or more second search tokens each specifying a particular bucket in which to search for the term. In response to the second tokens, the server sends information corresponding to encrypted documents that satisfy the search. Embodiments further provide for incremental addition and deletion of particular values for a term, and rebucketization at the client when a rate of false positive search results exceeds a threshold.

20 Claims, 6 Drawing Sheets

(56) References Cited

OTHER PUBLICATIONS

Abdalla, et al., "Searchable Encryption Revisited: Consistency Properties, Relation to Anonymous IBE, and Extensions," retrieved at <<http://www.cs.washington.edu/homes/yoshi/papers/PEKS/PEKS.pdf>>, Jul. 2005, 43 pages.

Ballard, et al., "Correlation-Resistant Storage via Keyword-Searchable Encryption," retrieved at <<http://spar.isi.jhu.edu/~mgreen/correlation.pdf>>, Cryptology ePrint Archive: Report 2005/417, Nov. 2005, 16 pages.

Boneh et al, "Conjunctive, Subset and Range Queries on Encrypted Data", Proc of 4th conf on Theory of Cryptography, Feb. 2007, 29 pgs.

Bu et al, "SEF: A Secure, Efficient and Flexible Range Query Scheme in Two Tiered Sensor Networks", May 2011, Intl Journal of Distributed Sensor Networks, vol. 2011, 12 pgs.

Curtmola, et al., "Searchable Symmetric Encryption: Improved Definitions and Efficient Constructions," retrieved at <<http://research.microsoft.com/pubs/102088/sse.pdf>>, Proceedings of the 13th ACM conference on Computer and Communications Security, Nov. 2006, pp. 79-88.

Nasrullah, "Hierarchical Query Mechanisms for Searchable Encrypted Databases-Secure Storage of Privacy Sensitive Tracking Information", Jun. 2009, Master Thesis, 56 pages.

Park et al, "Efficient Keyword Index Search over Encrypted Documents of Groups", Jun. 2008, IEEE Intl Conf on Intelligence and Security Informatics, pp. 225-229.

Park et al, "Searchable Keyword Based Encryption", Cryptology ePrint Archive, Report 2005/367, available at http://eprint.iacr.org, Sep. 2005, 13 pgs.

Sedghi, et al., "Adaptively Secure Computationally Efficient Searchable Symmetric Encryption," retrieved at <<http://eprints.eemcs.utwente.nl/15312/01/ESORICS09.pdf, Technical Report TR-CTIT-09-13, Centre for Telematics and Information Technology, University of Twente, Apr. 2009, 17 pages.

Sedghi, et al., "Towards an Information Theoretic Analysis of Searchable Encryption (Extended Version)," retrieved at <<http://eprints.eemcs.utwente.nl/13176/01/Paper_Technical_Report.pdf>>, Technical Report TR-CTIT-08-50, Centre for Telematics and Information Technology, University of Twente, Aug. 2008, 19 pages.

\* cited by examiner

RANGE-BASED QUERIES FOR SEARCHABLE SYMMETRIC ENCRYPTION

BACKGROUND

Users may store documents in a remote repository (e.g., database, cloud storage, and the like) for convenience, accessibility, storage capacity, reliability, backup capabilities, security, or other reasons. Such documents may contain sensitive, private, and/or personal information that the user does not wish to divulge regarding the user's health, finances, or other sensitive data. In some situations, contractual, legal, regulatory, or other obligations may require the entity which administers the remote repository to minimize the risk of unauthorized access to a user's documents. However, if the documents are stored in an unencrypted form on the remote repository, there may be few safeguards to prevent the administering entity from accessing a user's personal documents.

A user may address this concern by encrypting the documents at a client computing device, and storing the documents in encrypted form at the remote repository. This approach prevents the administering entity (or anyone else) from examining the documents, but may also prevent the user from performing operations on the stored documents. For example, the encryption of the documents prevents the user from performing an online search of the documents. The user may address this situation by downloading all the documents back to the client computing device, decrypting them all, and performing the desired search, but this solution may be time consuming and runs counter to the user's initial motivation for storing the documents in the remote repository.

To enable searches to be performed over encrypted document stores, the cryptographic community has developed a technique that is commonly referred to as Searchable Symmetric Encryption (SSE). One such SSE technique, for example, operates by storing an encrypted index together with the encrypted documents at a remote repository. The user then generates and submits a search token which is deterministically derived from a search term, but which conceals the search term. The remote repository then uses the encrypted index to identify and return a list of document identifiers that are associated with the search term. In this approach, the remote repository does not learn the identity of the search term associated with the search token, nor does the remote repository learn the identity of the documents conveyed in the search results. However, such existing SSE techniques fail to support more complex queries, and are therefore somewhat limited in their utility.

SUMMARY

Techniques are described for performing range-based queries in searchable symmetric encryption (SSE) systems. A server device includes or provides access to a database (or other data storage) that stores encrypted documents. Because the encrypted documents have been encrypted at a client device using encryption keys known to the client device, the server device may be prevented from accessing the plain-text, unencrypted version of each document. The database also includes an encrypted index that maps bucketized terms (e.g., a term associated with a range of values) to encrypted documents.

To search for an encrypted document, a client device may send to the server a first token that is created at the client device based on the desired search term. On receiving the first token, the server may send to the client device encrypted information for the plurality of buckets associated with the search term (e.g., the various numeric ranges available for searching, etc.). The client may then generate a second token based on the bucketized term (e.g., the search term and the bucket) to search on, and send the second token to the server. The server may then respond with the encrypted documents that satisfy the search (e.g., that include the search term and the bucket that includes the specified range of values). These techniques are described further herein with reference to the figures, along with further techniques for adding a new encrypted document to the database, adding a new value or a new search term, deleting a document, and rebucketization for a term.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
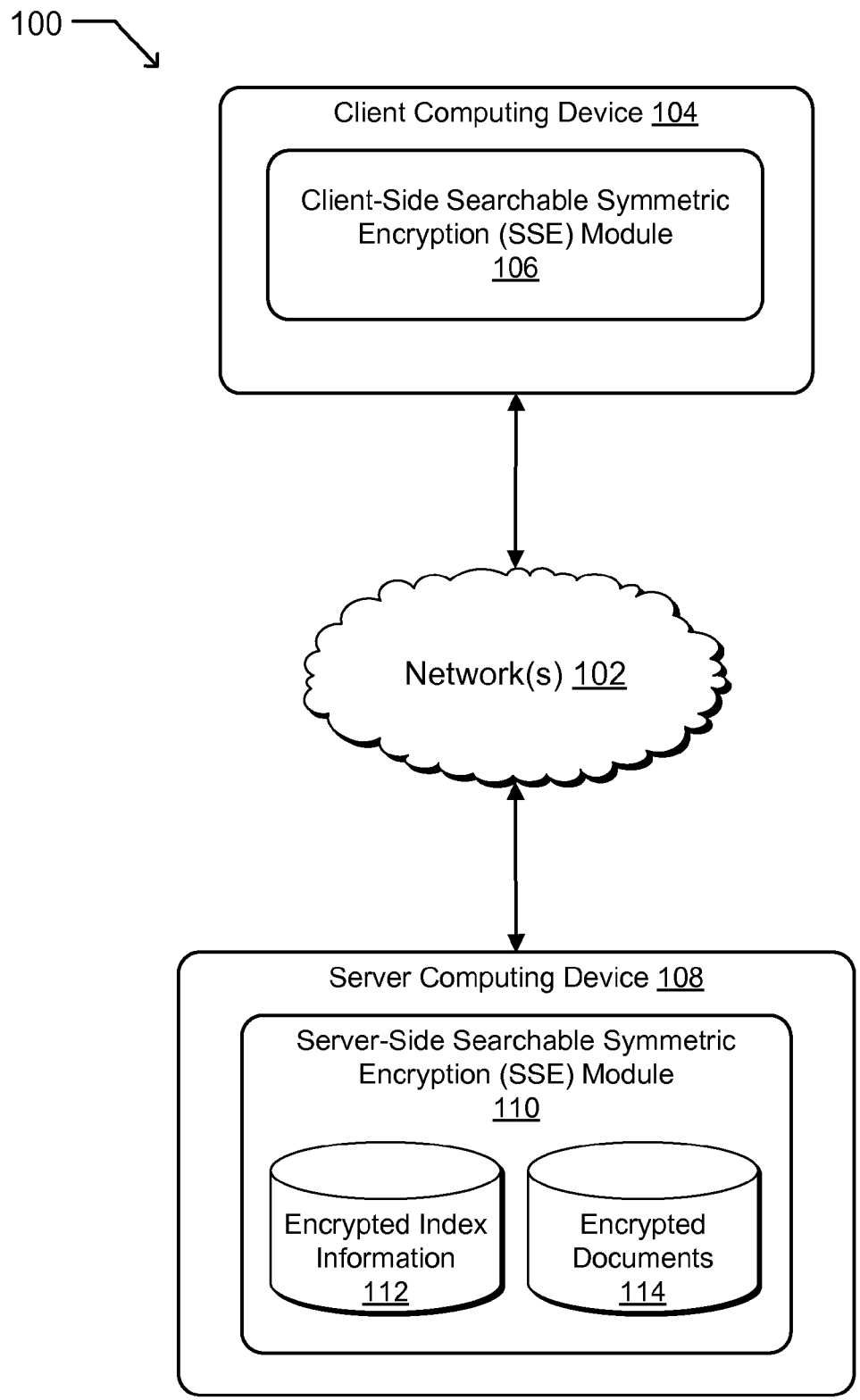
FIG. 1 is a diagram depicting an example environment in which embodiments may operate.

Embodiments described herein provide techniques for performing rich, range-based queries in Searchable Symmetric Encryption (SSE) systems, through use of at least one encrypted index that maps bucketized terms to the encrypted files, where one or more of the encrypted files include the term associated with a value within a numeric range of values specified by the bucketized term. As used herein, a bucketized term is a term, word, or phrase coupled with a numeric range of values associated with that term, word, or phrase. This range of values is referred to herein as a bucket. For example, to search for documents that include the term "age" and a value 50 associated with "age," a bucketized term "age +(45-55)" may be employed. In this example, the encrypted index maps "age +(45-55)" to encrypted documents that include "age" and a value in the range 45-55.

Embodiments support the discretization of a numeric range or other domain into a number of buckets (e.g., value ranges). This discretization (referred to herein as bucketization) may take place either at index generation time, while operating over a plaintext index at a client device, or when a new term is added to the index. In some embodiments, the bucketization algorithm is a simple, greedy bucketization algorithm that operates in a single pass over the possible data values. The algorithm is given as input a target number of items per bucket, and attempts to get as close to that number of items as possible. The index (or multiple encrypted indices) is stored in encrypted form on the server, to prevent the server administrator or other parties from accessing information related to the stored encrypted documents. For example, a bucketization of a term "age" may be {0-10, 11-20, 21-35, 36-50, 51-63, 64-72, and 73-115}.

An encrypted index provides a mapping from a term to the buckets for values associated with that term, in addition to storing the bucketized term and the term itself as keywords for searching. For example, the term high-density lipoprotein (HDL) may be a term in medical record documents, and may be associated with one or more values that represent the level of HDL cholesterol in a patient. In such a case, the encrypted bucket index includes entries for possible value ranges for HDL. Some embodiments described herein support an encrypted index that stores one or more of various types of mappings, including but not limited to:

- A mapping of the term to encrypted documents containing the term (e.g., a traditional database index);
- A mapping of the bucketized term (e.g., the term+a value range) to those encrypted documents containing the term in that value range; and
- A mapping of the term to the bucketization for that term (e.g., the possible value ranges associated with the term).

In some embodiments, such mappings may be included in a single index, or in multiple indices in any combination.

Moreover, embodiments described herein are not limited to a bucketization scheme in which a term is associated with a numeric range of possible numeric values for the term (e.g., a one-dimensional range of values). Embodiments may also provide for a bucketization in which a term is associated with one or more possible values that may be non-numeric (e.g., alphabetic, symbolic, and so forth). Moreover, embodiments may further provide for a bucketization that is multi-dimensional. For example, a term may be associated with a set of possible values that correspond to a multi-dimensional structure such as a grid covering a two-dimensional space (e.g., as in a coordinate grid for a geographical area or the world), a spatial coordinate system covering a three-dimensional space, and/or coordinate systems for higher dimensional spaces expressed mathematically or otherwise. Further, embodiments also support a bucketization in which a term is associated with a complex expression such as a regular expression that includes possible values for the term.

Embodiments provide techniques for searching the database of encrypted documents for a bucketized term (e.g., a search term that is associated in the document with a particular value or range of values). Such searching is described further below with reference to FIG. 3. Embodiments further provide techniques for adding a new value for a term or a new term to the encrypted index, for example when adding a new encrypted document to the database. Adding a new value or term is described further below with reference to FIGS. 4 and 5, and rebucketization is described further with reference to FIG. 6.

Illustrative Environment

FIG. 1 shows an example environment 100 in which embodiments may operate. As shown, the computing devices of environment 100 communicate with one another via one or more networks 102 that may include any type of networks that enable such communication. For example, networks 102 may include public networks such as the Internet, private networks such as an institutional and/or personal intranet, or some combination of private and public networks. Networks 102 may also include any type of wired and/or wireless network, including but not limited to local area networks (LANs), wide area networks (WANs), Wi-Fi, WiMax, and mobile communications networks (e.g., 3G, 4G, and so forth). Networks 102 may utilize communications protocols, including packet-based and/or datagram-based protocols such as internet protocol (IP), transmission control protocol (TCP), user datagram protocol (UDP), or other types of protocols. Moreover, networks 102 may also include a number of devices that facilitate network communications and/or form a hardware basis for the networks, such as switches, routers, gateways, access points, firewalls, base stations, repeaters, backbone devices, and the like.

Environment 100 further includes one or more client devices such as client computing device 104. In some embodiments, client computing device 104 is associated with one or more end users who may utilize the techniques described herein to provide encrypted documents for storage, and/or search, update, add, and/or delete encrypted documents, particular terms, and/or particular bucketized terms in the database. Client computing device 104 may include any type of computing device that a user may employ to send and receive information over networks 102. For example, client computing device 104 may include, but is not limited to, desktop computers, laptop computers, tablet computers, e-Book readers, wearable computers, media players, automotive computers, mobile computing devices, smart phones, personal data assistants (PDAs), game consoles, mobile gaming devices, set-top boxes, and the like.

Moreover, client computing device 104 includes a client-side SSE module 106 to perform client-side, SSE-related operations described herein. In some embodiments, client-side SSE module 106 may operate as a standalone application, program, or process. However, in some embodiments client-side SSE module 106 may operate as a component of another application, program, or process.

As further shown in FIG. 1, environment 100 may include one or more server devices such as server computing device 108. In some embodiments, server computing device is managed by, operated by, and/or generally associated with an individual, business, or other entity that provides network services for secure storage of encrypted documents using the SSE techniques described herein. Server computing device 108 may be virtually any type of networked computing device or cluster of networked computing devices.

Server computing device 108 includes a server-side SSE module 110 to perform server-side SSE-related operations described herein. In some embodiments, server-side SSE module 110 may operate as a standalone application, program, or process. However, in some embodiments server-side SSE module 110 may operate as a component of another application, program, or process. Server-side SSE module 110 may further include data storage (e.g., a database) that stores encrypted index information 112 and encrypted documents 114. In some embodiments, encrypted index information 112 stores encrypted information for the one or more indices described above, such as the encrypted index that provides a mapping from bucketized terms to encrypted documents that contain the bucketized terms. Encrypted documents 114 may include encrypted documents uploaded by users of client computing device 104. Such documents may be any type of content, including but not limited to text documents (formatted or unformatted), images, audio files, video files, or other types of content.

Although FIG. 1 depicts encrypted index information 112 and encrypted documents 114 as part of server-side SSE module 110, embodiments are not so limited and in some cases encrypted index information 112 and/or encrypted documents 114 may be stored in storage that is on server computing device 108 but separate from server-side SSE module 110. Moreover, in some embodiments encrypted index information 112 and/or encrypted documents 114 may be stored in data storage that is external to server computing device 108, and server-side SSE module 110 may be configured to access this data over network(s) 102.

Illustrative Computing System Architecture

Figure 2:
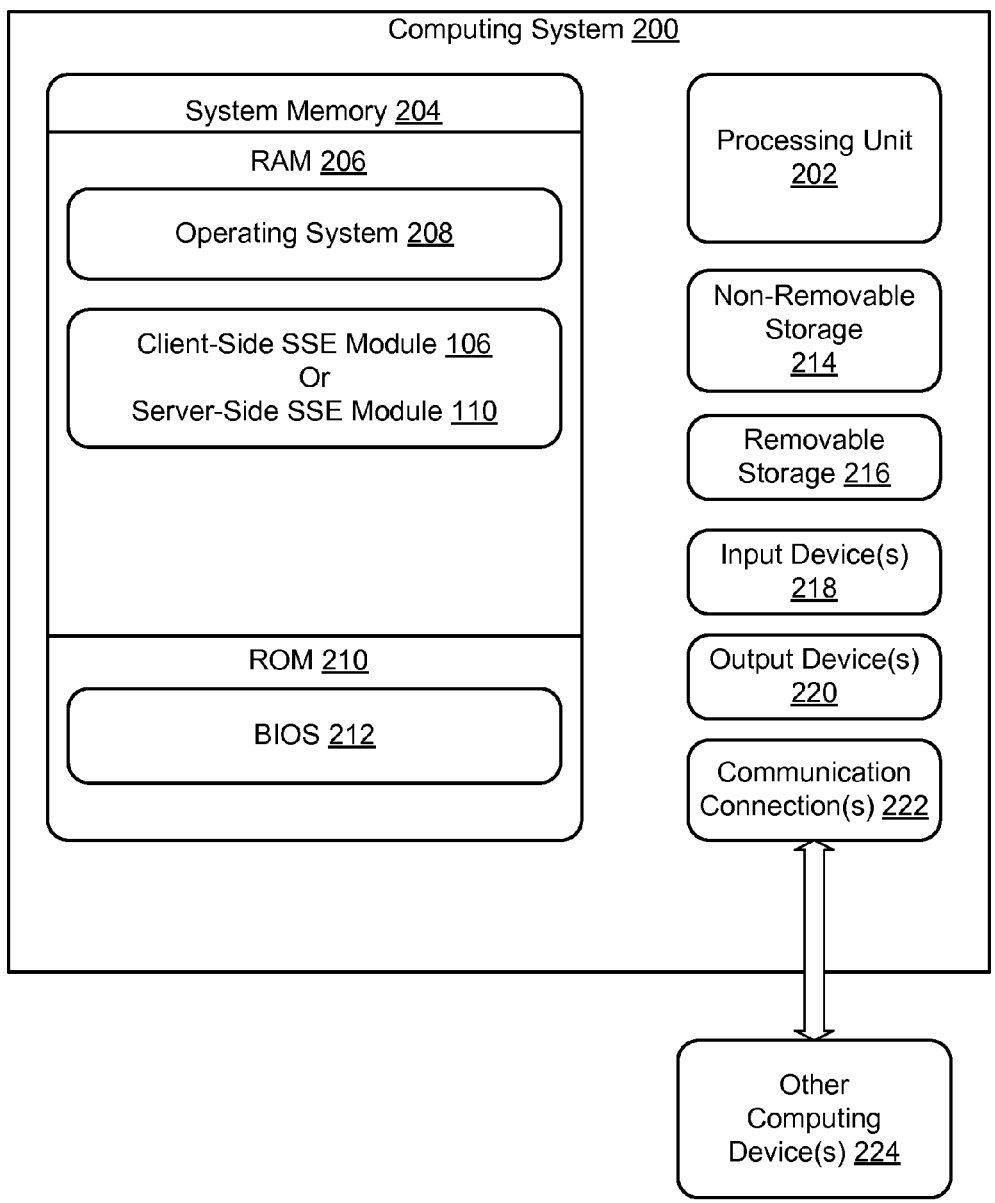
FIG. 2 is a diagram depicting an example computing system, in accordance with embodiments.

FIG. 2 depicts an example computing system 200 in which embodiments may operate. In some embodiments, computing system 200 is an example of client computing device 104 and/or server computing device 108 depicted in FIG. 1. Computing system 200 includes processing unit 202. Processing unit 202 may encompass multiple processing units, and may be implemented as hardware, software, or some combination thereof. Processing unit 202 may include one or more processors. As used herein, processor refers to a hardware component. Moreover, processing unit 202 may include computer-executable, processor-executable, and/or machine-executable instructions written in any suitable programming language to perform various functions described herein.

Computing system 200 further includes a system memory 204, which may include volatile memory such as random access memory (RAM) 206, static random access memory (SRAM), dynamic random access memory (DRAM), and the like. RAM 206 includes one or more executing operating systems (OS) 208, and one or more executing processes including components, programs, or applications that are loadable and executable by processing unit 202. Such processes may include client-side SSE module 106 (e.g., in cases where computing system 200 represents client computing device 104) and server-side SSE module 110 (e.g., in cases where computing system 200 represents server computing device 108). Operations of client-side SSE module 106 and server-side SSE module 110 are described further below with reference to FIGS. 3-6.

System memory 204 may further include non-volatile memory such as read only memory (ROM) 210, flash memory, and the like. As shown, ROM 210 may include a Basic Input/Output System (BIOS) 212 used to boot computing system 200. Though not shown, system memory 204 may further store program or component data that is generated and/or utilized by OS 208, client-side SSE module 106, server-side SSE module 110, and/or other processes executing in system memory 204. System memory 204 may also include cache memory.

As shown in FIG. 2, computing system 200 may also include non-removable storage 214 (e.g., a hard drive) and/or removable storage 216, including but not limited to magnetic disk storage, optical disk storage, tape storage, and the like. Disk drives and associated computer-readable media may provide non-volatile storage of computer readable instructions, data structures, program modules, and other data for operation of computing system 200.

In general, computer-readable media includes computer storage media and communications media.

Computer storage media is tangible media that includes volatile and non-volatile, removable and non-removable media implemented in any method or technology for storage of information such as computer readable instructions, data structure, program modules, and other data. For example, computer storage media may include computer-readable storage media storing instructions, programs, and/or data which, when executed by a processor, instruct the processor to perform actions for techniques described herein. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media is non-tangible and may embody computer readable instructions, data structures, program modules, or other data in a modulated data signal, such as a carrier wave or other transmission mechanism. As defined herein, computer storage media does not include communication media.

Computing system 200 may include input device(s) 218, including but not limited to a keyboard, a mouse, a pen, a game controller, a voice input device for speech recognition, a touch input device, a gesture recognition device, and the like. Computing system 200 may further include output device(s) 220 including but not limited to a display, a printer, audio speakers, a haptic output, and the like. Computing system 200 may further include communications connection(s) 222 that allow computing system 200 to communicate with other computing devices 224 including client devices, server devices, databases, and/or other networked devices available over one or more communication networks.

Example Search Operations

FIGS. 3-6 depict flowcharts showing example processes in accordance with various embodiments. The operations of these processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be combined in any order, subdivided into multiple sub-operations, and/or executed in parallel to implement the described processes.

In some embodiments, the client-side operations depicted in FIGS. 3-6 are executed by client-side SSE module 106 and/or some other component of client computing device 104. In some embodiments, the server-side operations depicted in FIGS. 3-6 are executed by server-side SSE module 110 and/or some other component of server computing device 108.

Figure 3:
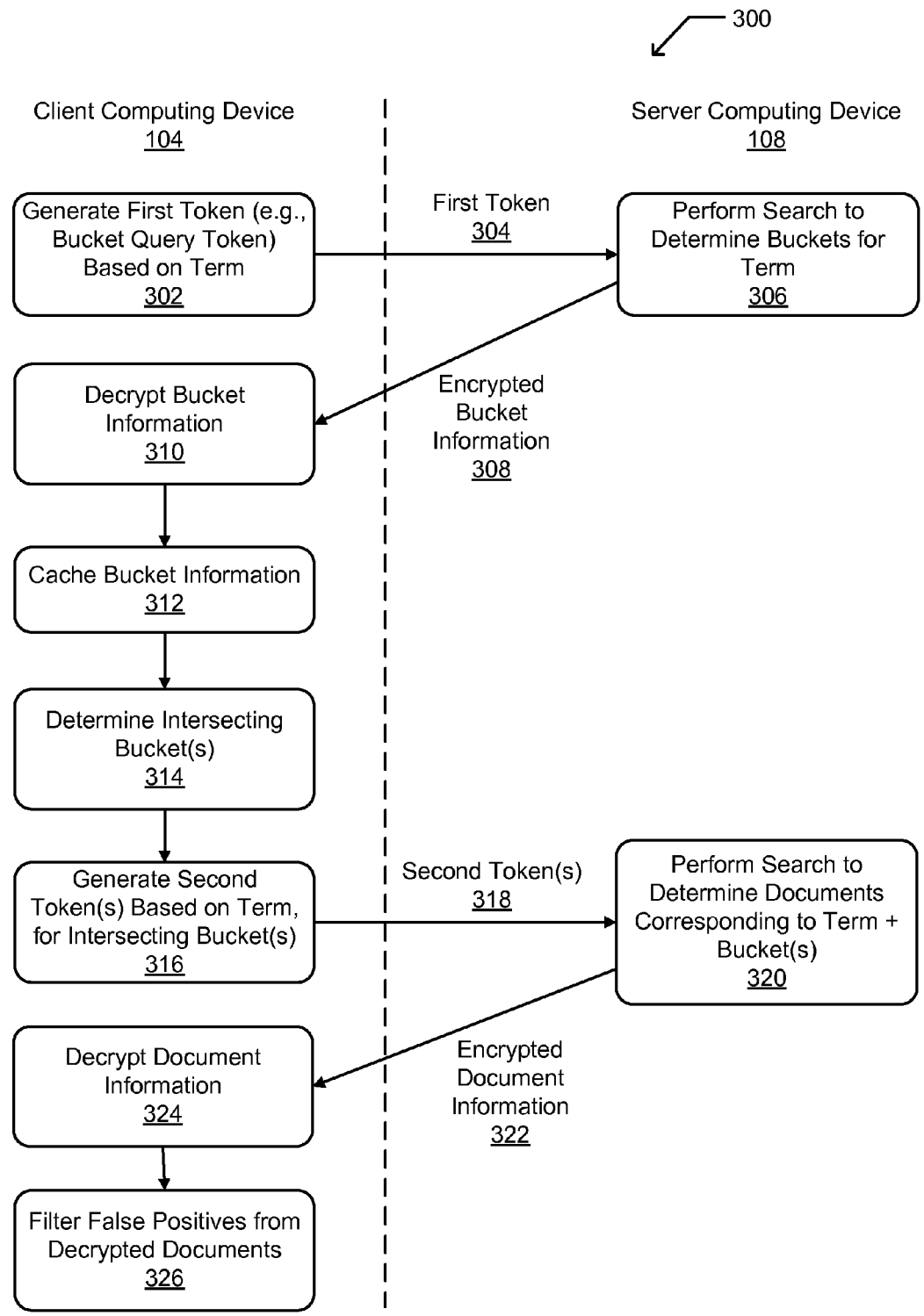
FIG. 3 depicts a flow diagram of an illustrative process for searching a database of encrypted documents for those documents that include a bucketized term, according to embodiments.

FIG. 3 depicts an example process 300 for searching the database of encrypted documents for documents that include a bucketized term, according to embodiments. In some embodiments searches are performed in two or more rounds of communications between client computing device 104 and server computing device 108, where each round may be initiated by client computing device 104 sending a search token to server computing device 108. In some embodiments, these two rounds of communications may occur within a same communications session between the client device and the server device, or the two rounds may occur in separate communications sessions. As shown in FIG. 3, at 302 the client generates a first token based on the search term specified by the user. This first token is also referred to herein as a bucket query token, in that it is used to request from the server a current bucketization for the search term.

In some embodiments, a token (e.g., a bucket token, or a search token as described below) is composed of three components that are each generated from the term or the bucketized term. The first component allows the server to find the entry for the search token in a table. The second component allows the server to decrypt the entry for this token in the table. The third component is a key that allows the server to follow the encrypted links for the list of documents.

In some embodiments, the bucket query token and/or other tokens described herein are deterministically generated based on their respective terms (e.g., such that the particular generated token could not have been based on another term). In some embodiments, the client generates the token by incorporating the term into the token in an encrypted or otherwise obfuscated form, such that processes on the server may not view the term in plaintext. In some embodiments, this bucket query to request the bucketization is specified by prepending an integer or other prefix to the search term. In some embodiments, this prepended prefix is used to distinguish bucket queries from regular term queries. For example, a bucket query for "HDL" may be requested using the term "2HDL" incorporated into a first token.

The client sends the generated first token 304 to the server to request a bucket query of the search term to return the buckets for that term. At 306, the server performs such a search to determine buckets for the term. In some embodiments, this search includes the server accessing one or more encrypted indices which include bucket information for the term, e.g., which map the term to one or more bucketized terms. On receiving the first token 304, the server may return encrypted bucket information 308, e.g., the buckets for the term in encrypted form. In some embodiments a cache or other local memory on the client may be first checked and if the bucketization for the desired term is stored locally then the client may skip the first round.

In some embodiments, after the first search returns the encrypted bucket information 308 for the search term, at 310 the client decrypts the bucket information. In some embodiments the client may, at 312, store the decrypted bucket information for the term in a cache or other local memory for future use. At 314, the client computes or otherwise determines the intersection of the received buckets for the term with a range of values to be searched over, and determines the overlapping buckets. For example, in a case where a bucketization for the term age is {0-10, 11-20, 21-35, 36-50, 51-63, 64-72, and 73-115}, and a user wishes to search for documents that include the term age associated with a value in the range of 18-26, there are two overlapping buckets (the 11-20 bucket and the 21-35 bucket).

At 316, the client generates one or more second search tokens 318 that each include a bucketized word, i.e., the search term and a bucket to search over. In some embodiments, this second token is prepended with a particular integer (e.g., 0) to indicate a document search as opposed to the first bucket search to return the bucketization. For example, the keyword for such a search may be "OHDL30_50" to indicate a regular search for the term "HDL" in the range 30-50. In some embodiments, an additional separator may be included in the keyword to denote the separation between the search term (e.g., "HDL") and the bucket (e.g., 30-50). In cases where the client's desired search range does not exactly match a particular bucket, multiple second tokens may be generated each specifying a search over a different bucket. In some embodiments, the second search tokens include the bucketized search term in an encrypted form.

The client sends the one or more generated second tokens 318 to the server, which at 320 performs a search (or multiple searches based on multiple second tokens 318) to determine those encrypted documents corresponding to the bucketized word included in each received second token. The server then returns the resulting encrypted document information 322 to the client. At 324, the client decrypts the document information. In some embodiments, the encrypted document information includes encrypted data for the document as well as the value of the search term in each document (e.g., if a particular document includes HDL=40).

At 326, the client may then use this information to filter out any false positives in the search results. False positives include those cases where the client searches on a particular range for a term, and receives in the search results documents which include the term outside that range. Such false positives may occur because the overlap between the client's search range and the bucket ranges for a term may not be exact. In some embodiments, the client may track the number of false positives received, and determine to perform a rebucketization for the term if it determines that the cost of performing the rebucketization is merited to save future cost of filtering out false positives. Rebubucketization is described further below.

Example Add Operations

Figure 4:
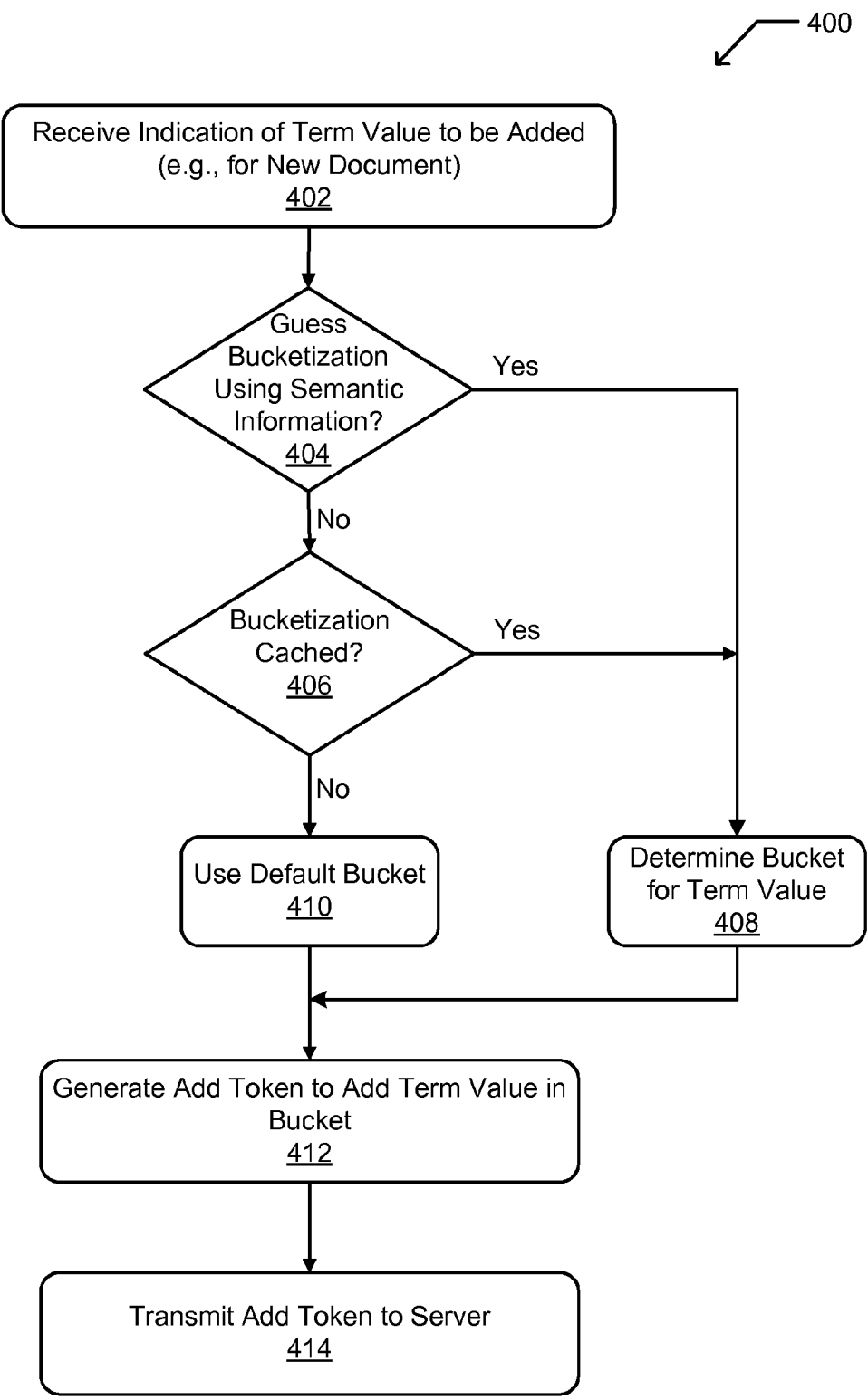
FIG. 4 depicts a flow diagram of an illustrative process for adding a new bucketized term value to the encrypted index for a database of encrypted documents, according to embodiments.
Figure 5:
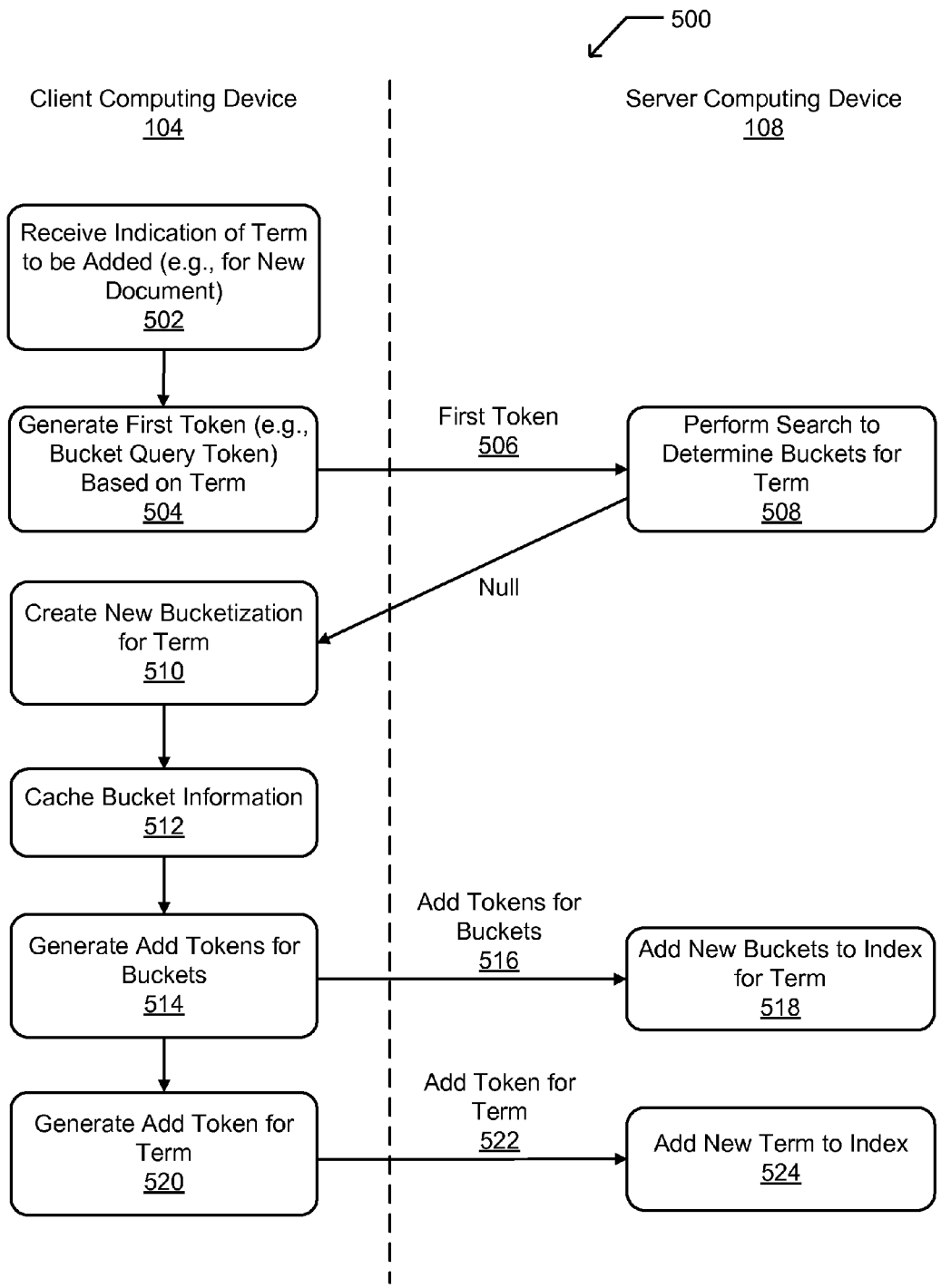
FIG. 5 depicts a flow diagram of an illustrative process for adding a new term and/or bucketized term value to the encrypted index for a database of encrypted documents, according to embodiments.

Embodiments include add operations to enable a client to put values into buckets, and/or create new bucketizations for terms that are not yet bucketized. FIG. 4 depicts an embodiment in which a bucketization for a term is currently stored on the server and a new term value (e.g., a new value for a particular term) is to be added into the current bucketization. FIG. 5 depicts an embodiment in which a bucketization for a term is not currently stored on the server (e.g., when a new term is being added). Both situations may arise in cases where a new encrypted document is being stored on the server, when a stored encrypted document is being updated, and/or when a new term has been identified to be made available for range-based SSE searching.

FIG. 4 depicts a flow diagram of an illustrative process 400 for adding a new term value to the encrypted index for a database of encrypted documents, according to embodiments. At 402, the client receives an indication of a term value to be added (e.g., when adding a new document). To request addition of the new term value at the server, the client determines the bucketization for the term so that it may specify the particular bucket in which the term value is to be added. In some embodiments, the client may determine the bucketization through a process that is substantially similar to that described above with regard to FIG. 3 (e.g., 302-310). Accordingly, the client may request the current bucketization from the server by generating a bucket query token, transmitting it to the server, receiving encrypted bucket information from the server in response, and decrypting the bucket information.

However, such a request for the currently stored bucketization may be expensive, particularly where multiple term values are being added. Thus, embodiments support various optimizations which may be used individually or in combination to expedite the determination of a bucketization for the term. Such example optimizations are illustrated in FIG. 4. At 404, the client may attempt to guess the bucketization for the term using semantic information about the term. For example, when adding a value for the term "age" or the term "blood pressure," the client may use a known age or blood pressure distribution for a certain collection of individuals (e.g., distributions within individuals of a particular city, county, state/province, nation, and/or the word) and guess a bucketizaiton based on that known distribution.

If the client is unable to guess the bucketizaiton using semantic information, at 406 the client determines whether the bucketization has been cached or otherwise stored locally. As described above, in some cases the client may already have the bucketization for a term stored in its cache or other local memory. In some embodiments, the cache may also store a time/date stamp indicating when the bucketization was stored, and a cached bucketization may be used if its time/date stamp indicates that it is younger than a certain threshold period of time.

If the client is able to guess the bucketization at 404, or use a cached bucketization at 406, then at 408 the client may use the guessed and/or cached bucketization and determine in which bucket the new value for the term is to be placed. If the client was unable to guess the bucketization and did not have a cached bucketization, then at 410 the client may determine to place the new term value into a default bucket. In some cases, use of a default bucket may lead to more and more false positives over time, as more and more values are placed into the default bucket. However, embodiments may incur this cost (e.g., increasing false positives) to avoid a higher cost of querying the server for the current bucketization each time a new term value is to be added. If the client detects a high number of false positives (e.g., above a certain threshold number), the client may determine to perform a rebucketization as described below.

At 412 an add token is generated for the new term value based on the bucket determined at 408 or the default bucket determined at 410. In some embodiments, the add token includes the bucketized term for the value (e.g., the term plus the particular bucket corresponding to the value), as well as information indicating to the server that the value is to be added into the corresponding bucket. In some embodiments, the client may perform one or more additional steps to clean up the buckets using the rebucketization techniques described below. At 414 the add token is transmitted to the server, to instruct the server to add the term value into the specified bucket.

FIG. 5 depicts a flow diagram of an illustrative process 500 for adding a new term (e.g., a term that does not currently have a stored bucketization) to the encrypted index for a database of encrypted documents, according to embodiments. At 502, the client receives an indication of a term to be added (e.g., when a new document is to be stored in encrypted form on the server, or when a new term is to be made available for search). The client may then request a current bucketization from the server, and this request may proceed similarly to that described with regard to 302-310 of FIG. 3. At 504 the client generates a first token 506 (e.g., a bucket query token) based on the term, as described above. The first token 506 is then transmitted to the server, which performs a search at 508 to determine a plurality of buckets for the term based on the one or more encrypted indices stored by the server. In this case, the server may determine (e.g., based on the one or more encrypted indices) that the term does not currently have a bucketization stored. The server may then send null information in its response to the client, or some other indication that there is no current bucketization for the term.

At 510 the client creates a new bucketization for the term using a bucketization algorithm. In some embodiments, the bucketization algorithm is a simple, greedy algorithm to attempt to distribute values substantially equally so that each bucket contains a similar, target number of values as described above. In some embodiments, the bucket information for the newly created bucketization is cached on the client at 512 for future potential use.

Having created the new bucketization for the term, the client may then request to have each new bucket for the bucketization added at the server. To do so, the client at 514 generates an add token for each new bucket to be added. In some embodiments, each add token includes information for the term, the range of values for the bucket, and a particular keyword indicating that the server is to perform a bucket addition operation on receiving the token. The add tokens for buckets 516 are transmitted to the server, which adds new buckets to the encrypted indices at 518.

At 520, the client generates an additional add token for the term itself. This add token indicates to the server that a mapping is to be added that maps the term to the new encrypted document being added (e.g., as in a traditional database index). This add token for term 522 is then sent to the server, which adds the new term to the indices at 524. Through process 500, terms that do not have a bucketization but do have values in the document being added are bucketized at the client using a bucketization technique such as that described below, then the new buckets are added to the server through separate add operations. Further, in some embodiments operations for adding a new term may proceed in the same way or similarly to those operations for adding a known term, as described with reference to FIG. 4.

Example Deletion Operations

Embodiments also support deletion/removal of an encrypted document from the database on the server, and/or deletion of one or more particular terms from the one or more encrypted indices on the server.

In known SSE techniques, deletion is provided through use of multiple indices, generated and encrypted at the client and stored on the server in encrypted form. A first deletion index maps each term to an array that contains encrypted file information for that term (e.g., information indicating which encrypted documents include the term). The second deletion index maps each encrypted document to a list of terms included in the document (e.g., an inverse of the mapping in the first deletion index). To delete a term, the client provides cryptographic information to unlock the second deletion index, and each item in the second deletion index provides a pointer into the first deletion index, allowing the server to remove individual entries from the list in the first deletion index. In some embodiments, the deletion indices are further protected through use of an XOR cipher. The client may create a cryptographic value using a random number and then perform an operation to XOR that cryptographic value with each unencrypted entry in the deletion index.

Embodiments modify known SSE techniques and provide incremental delete tokens and incremental add tokens to respectively enable incremental deletions and additions of particular term values and/or particular terms in the one or more indices stored on the server. To update (e.g., add or delete) a single, particular term at a time, embodiments provide for an additional data structure (e.g., a hash table) that maps from individual document-term pairs to an entry in the two deletion indices described above. In some embodiments, the data structure (e.g., hash table) does not provide plaintext information, and instead provides encrypted information for document-term pairs. In some embodiments, each entry contains the encryption of a key that enables the client to decrypt that entry and request that the server perform the regular deletion algorithm for that entry according to known SSE deletion methods.

Such an additional data structure may enable the client to request deletion of a single term entry from a single bucket. However, such embodiments may further employ a modification of the deletion index. For example, in some embodiments each document term entry is encrypted with a separate key which is generated using random information and the document key. In some embodiments, the key for a given entry may be generated using some random number combined with a document key. This second level key may be stored in the hash table described above. In some cases, the second level key is used to decrypt only the particular entry.

Example Rebucketization Operations

Figure 6:
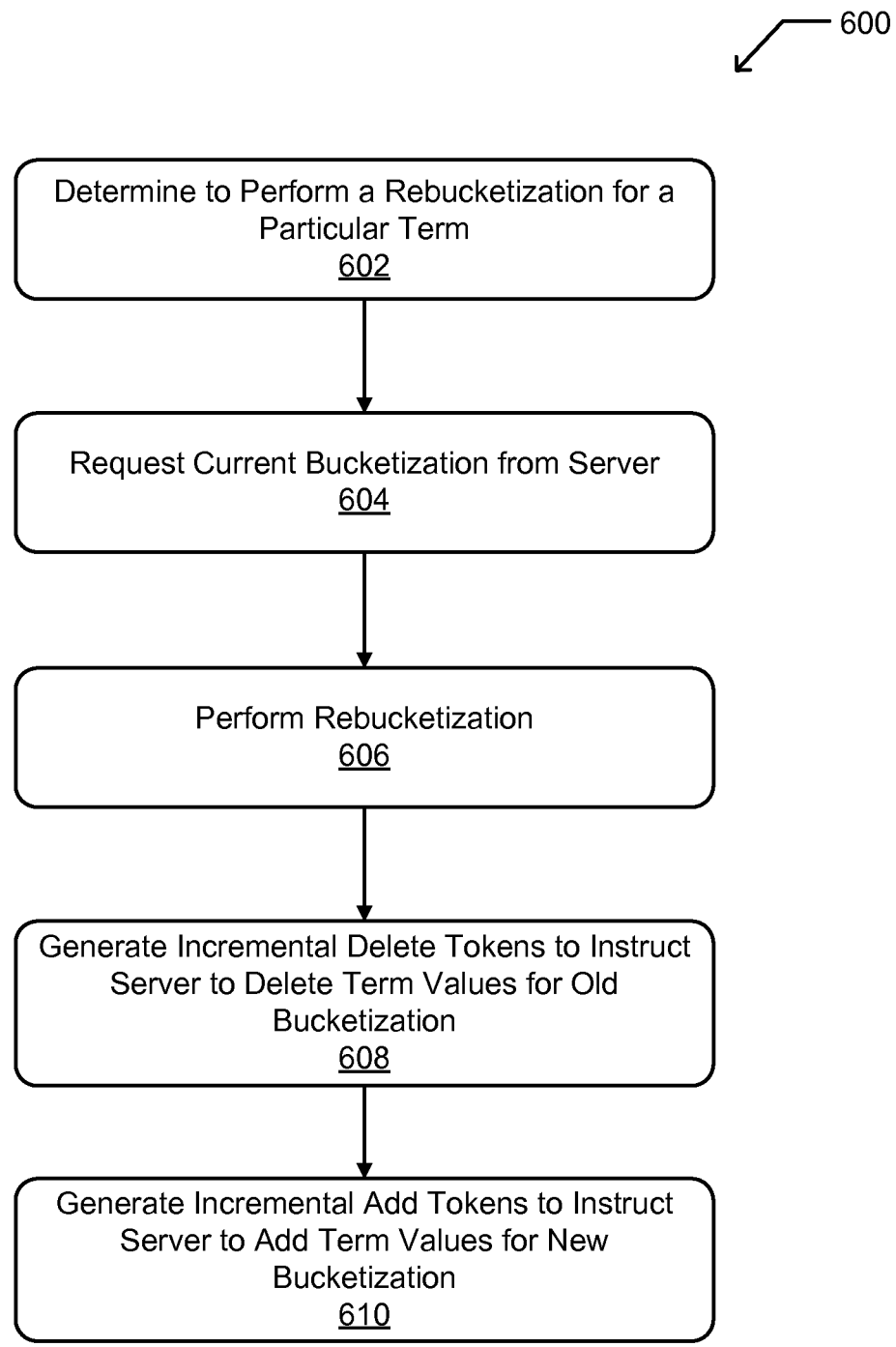
FIG. 6 depicts a flow diagram of an illustrative process for rebucketizing, according to embodiments.

Embodiments further support rebucketization to enable the client to modify the bucketization for a given term. FIG. 6 depicts a flow diagram of an illustrative process 600 for rebucketizing, according to embodiments. In some embodiments, process 600 is executed as a software component (or as part of a software component) such as client-side SSE module 106 on client computing device 104.

At 602 a determination is made (e.g., at the client) to perform a rebucketization for a particular term. In some embodiments, this determination is made based on the client determining that it is receiving above a certain threshold number of false positives in search results for the term received from the server. However, embodiments are not so limited and the client may also determine to rebucketize based on a periodically scheduled rebucketization job (e.g., nightly, weekly). Further, the client may rebucketize during period when it is otherwise idle or tasked with few or no other processes to run (e.g., during slow time). In some embodiments, the determination to rebucketize may be based on a cost/benefit analysis performed on the client. For example, the client may determine that it is worth incurring the cost of rebucketizing to save a future (e.g., possibly higher) cost of analyzing an increasing number of false positive search results.

At 604 the client requests a current bucketization from the server. In some embodiments, this request may proceed as described above in steps 302-310, e.g., generating and sending a bucket query token for the term to the server, and receiving and decrypting bucket information received in response from the server.

At 606 the client performs the rebucketization using a bucketization algorithm. As described above, in some embodiments the bucketization algorithm is a simple, greedy bucketization that operates in a single pass over the possible data values for the term. The algorithm is given as input a target number of values per bucket, and attempts to get as close to that number of values as possible. This substantially even distribution of values among buckets may server to obfuscate information about the encrypted term from processes on the server.

At 608 the client generates one or more incremental delete tokens to instruct the server to delete, one by one, the term values for the old bucketization from the one or more encrypted indices on the server. The client then transmits these delete tokens to the server. At 610 the client generates one or more incremental add tokens to instruct the server to add, one by one, the new term values for the newly determined bucketization. The client then transmits these add tokens to the server. Further, in some embodiments the delete tokens and the add tokens may be transmitted to the server simultaneously and/or in parallel, instead of serially as depicted in FIG. 6.

Conclusion

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A system comprising:
   one or more processors;
   one or more computer-readable storage media, including:
      at least one database storing encrypted documents that include terms; and
      at least one encrypted index that maps one or more bucketized terms to one or more of the encrypted documents, each of the one or more bucketized terms including one of the terms included in the encrypted documents and a bucket including one or more values for the one of the terms; and
   a searchable symmetric encryption (SSE) module executed by the one or more processors to:
      receive at least one search token that is associated with a search term and with one of a plurality of buckets for the search term, the search term being at least one of the terms included in the encrypted documents;
      in response to receiving the at least one search token, provide one or more of the encrypted documents that satisfy the search term and the one of the plurality of buckets, based on the at least one encrypted index; and
      compute an add token that indicates the search term and one of the plurality of buckets for the search term that is to be updated with a new value for a range of values associated with the search term, wherein the at least one encrypted index is updated based on the new value.

2. The system of claim 1, wherein the SSE module further operates to:
   receive a bucket search token that is associated with the search term, prior to receiving the at least one search token; and
   in response to receiving the bucket search token, provide encrypted information for a plurality of buckets associated with the search term as determined from the one or more bucketized terms in the at least one encrypted index.

3. The system of claim 2, wherein the bucket search token is received in a first communication from a client device, and wherein at least one search token is received in a second communication from the client device.

4. The system of claim 3, wherein the first and second communications are received during a same communications session between the client device and the computing system.

5. The system of claim 1, wherein the at least one encrypted index is encrypted at a client device and provided to the computing system from the client device.

6. The system of claim 1, wherein the one or more values for the one of the terms include one or more numeric ranges of possible values for the one of the terms.

7. The system of claim 1, wherein the SSE module further operates to transmit the add token to the database.

8. The system of claim 1, wherein the one or more values for the one of the terms include a multi-dimensional grid of possible values for the one of the terms.

9. One or more computer-readable storage devices storing instructions that, when executed by at least one processor, instruct the at least one processor to perform actions comprising:
   determining a plurality of buckets that each specifies a subset of a range of values associated with a term, the plurality of buckets spanning the range of values;

computing an add token that indicates the term and one of the plurality of buckets that is to be updated with a new value for the range of values associated with the term; and transmitting the add token to a server in communication with a database, the database storing encrypted documents and at least one encrypted index that maps each of one or more bucketized terms to one or more of the encrypted documents, the add token instructing a component on the server to update the at least one encrypted index based on the indicated one of the plurality of buckets for the new value.

10. The one or more computer-readable storage devices of claim 9, wherein determining the plurality of buckets includes inferring the plurality of buckets based at least in part on semantic information associated with the term.

11. The one or more computer-readable storage devices of claim 9, wherein the one of the plurality of buckets that is to be updated is a default bucket.

12. The one or more computer-readable storage devices of claim 9, wherein determining the plurality of buckets includes:
- computing a bucket query token based on a term;
- transmitting the bucket query token to the server;
- in response to the transmitted bucket query token, receiving encrypted information for the plurality of buckets associated with the term; and
- decrypting the encrypted information to determine the plurality of buckets.

13. The one or more computer-readable storage devices of claim 12, wherein the bucket query token includes a prefix indicating that the server is to provide the encrypted information for the plurality of buckets in response to receiving the bucket query token.

14. The one or more computer-readable storage devices of claim 9, wherein the add token includes a prefix indicating that the server is to update the at least one encrypted index based on the new value.

15. The one or more computer-readable storage devices of claim 9, wherein determining the plurality of buckets includes accessing locally cached information for the plurality of buckets.

16. A computer-implemented method, comprising:
computing a first token based on a term;
transmitting the first token to a server that includes a database of encrypted documents and at least one encrypted index that maps one or more bucketized terms to one or more of the encrypted documents;
in response to transmitting the first token, receiving an indication that the term is not currently included in the at least one encrypted index;
in response to receiving the indication that the term is not currently included in the at least one encrypted index, determining a bucketization for the term, the bucketization including a plurality of buckets each specifying a range of values associated with the term;
computing a second token that includes the determined bucketization for the term;
transmitting the second token to the server to instruct the server to update the at least one encrypted index based on the bucketization for the term.

17. The method of claim 16, further comprising encrypting the second token prior to transmitting the second token to the server.

18. The method of claim 16, wherein determining the bucketization for the term includes determining the plurality of buckets by targeting a particular count of the values for each of the plurality of buckets.

19. The method of claim 16, wherein determining the bucketization for the term employs a linear, greedy algorithm for determining the plurality of buckets.

20. The method of claim 16, further comprising:
- computing at least one third token based on the term, the at least one third token indicating which of the plurality of buckets is to be incrementally updated for one of the values associated with the term; and
- transmitting the at least one third token to the server to instruct the server to incrementally update the at least one encrypted index based on the one of the values.

* * * * *